US010671597B1

(12) United States Patent
Roy et al.

(10) Patent No.: US 10,671,597 B1
(45) Date of Patent: Jun. 2, 2020

(54) DATA MANAGEMENT SYSTEM AND METHOD

(71) Applicant: EMC IP Holding Company, LLC, Hopkinton, MA (US)

(72) Inventors: Amit Roy, Lexington, MA (US); Rajesh Gandhi, Shrewsbury, MA (US); Robert Andrew Foulks, Nashua, NH (US); Ying Xie, Harvard, MA (US); Shyamsunder Singaraju, Westborough, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 272 days.

(21) Appl. No.: 15/664,205

(22) Filed: Jul. 31, 2017

(51) Int. Cl.
  *G06F 16/20* (2019.01)
  *G06F 16/23* (2019.01)
  *G06F 16/28* (2019.01)

(52) U.S. Cl.
  CPC ........ *G06F 16/2365* (2019.01); *G06F 16/285* (2019.01)

(58) Field of Classification Search
  None
  See application file for complete search history.

(56) References Cited

U.S. PATENT DOCUMENTS

| | | | |
|---|---|---|---|
| 6,847,970 B2 * | 1/2005 | Keller | G06F 11/008 |
| 2010/0095268 A1 * | 4/2010 | Lowry | G06Q 10/10 717/102 |
| 2017/0017677 A1 * | 1/2017 | Jolfaei | G06F 16/2358 |

* cited by examiner

*Primary Examiner* — Belix M Ortiz Ditren
(74) *Attorney, Agent, or Firm* — Brian J. Colandero; Mark H. Whittenberger; Holland & Knight LLP

(57) ABSTRACT

A method, computer program product, and computing system for determining, at the computing device, one or more dependencies associated with a plurality of managed objects and a plurality of backend objects. A plurality of consistency groups with one or more managed objects of the plurality of managed objects and one or more backend objects of the plurality of backend objects may be generated based upon, at least in part, the one or more dependencies associated with the plurality of managed objects and the plurality of backend objects. The one or more backend objects of the plurality of consistency groups may be fetched. The one or more managed objects of the plurality of consistency groups may be updated based upon, at least in part, the one or more fetched backend objects.

20 Claims, 4 Drawing Sheets

US 10,671,597 B1

DATA MANAGEMENT SYSTEM AND METHOD

BACKGROUND

Storage systems may include various hardware components (e.g., storage processors, storage devices, and power supplies). These storage systems may provide services over multiple network connections that expose different protocols. Many storage resources (e.g., storage pools, LUNs, file systems) may be created, monitored and modified within these storage systems.

SUMMARY OF DISCLOSURE

In one example implementation, a computer-implemented method is executed on a computing device and may include but is not limited to determining, at the computing device, one or more dependencies associated with a plurality of managed objects and a plurality of backend objects. A plurality of consistency groups with one or more managed objects of the plurality of managed objects and one or more backend objects of the plurality of backend objects may be generated based upon, at least in part, the one or more dependencies associated with the plurality of managed objects and the plurality of backend objects. The one or more backend objects of the plurality of consistency groups may be fetched. The one or more managed objects of the plurality of consistency groups may be updated based upon, at least in part, the one or more fetched backend objects.

One or more of the following example features may be included. Determining the one or more dependencies may include determining one or more dependencies associated with a plurality of managed object types and a plurality of backend object types from one or more applications associated with the plurality of managed object types. Fetching the one or more backend objects of the plurality of consistency groups may include storing the one or more fetched backend objects of the plurality of consistency groups in a temporary database. Fetching the one or more backend objects may include fetching the one or more backend objects of a first consistency group of the plurality of consistency groups in parallel with the one or more backend objects of a second consistency group of the plurality of consistency groups. Updating the one or more managed objects of the plurality of consistency groups may include transforming the one or more fetched backend objects of the plurality of consistency group into one or more updated managed objects. The one or more managed objects of one or more consistency groups of the plurality of the consistency groups may be exposed to a user when the one or more managed objects of the one or more consistency groups are updated. The one or more dependencies may include one or more of dependencies between at least two managed objects of the plurality of managed objects and dependencies between at least two backend objects of the plurality of backend objects.

In another example implementation, a computer program product resides on a computer readable medium that has a plurality of instructions stored on it. When executed across one or more processors, causes at least a portion of the one or more processors to perform operations that may include but are not limited to determining one or more dependencies associated with a plurality of managed objects and a plurality of backend objects. A plurality of consistency groups with one or more managed objects of the plurality of managed objects and one or more backend objects of the plurality of backend objects may be generated based upon, at least in part, the one or more dependencies associated with the plurality of managed objects and the plurality of backend objects. The one or more backend objects of the plurality of consistency groups may be fetched. The one or more managed objects of the plurality of consistency groups may be updated based upon, at least in part, the one or more fetched backend objects.

One or more of the following example features may be included. Determining the one or more dependencies may include determining one or more dependencies associated with a plurality of managed object types and a plurality of backend object types from one or more applications associated with the plurality of managed object types. Fetching the one or more backend objects of the plurality of consistency groups may include storing the one or more fetched backend objects of the plurality of consistency groups in a temporary database. Fetching the one or more backend objects may include fetching the one or more backend objects of a first consistency group of the plurality of consistency groups in parallel with the one or more backend objects of a second consistency group of the plurality of consistency groups. Updating the one or more managed objects of the plurality of consistency groups may include transforming the one or more fetched backend objects of the plurality of consistency group into one or more updated managed objects. The one or more managed objects of one or more consistency groups of the plurality of the consistency groups may be exposed to a user when the one or more managed objects of the one or more consistency groups are updated. The one or more dependencies may include one or more of dependencies between at least two managed objects of the plurality of managed objects and dependencies between at least two backend objects of the plurality of backend objects.

In another example implementation, a computing system one or more processors and one or more memories, wherein the computing system is configured to perform operations that may include but are not limited to determining one or more dependencies associated with a plurality of managed objects and a plurality of backend objects. A plurality of consistency groups with one or more managed objects of the plurality of managed objects and one or more backend objects of the plurality of backend objects may be generated based upon, at least in part, the one or more dependencies associated with the plurality of managed objects and the plurality of backend objects. The one or more backend objects of the plurality of consistency groups may be fetched. The one or more managed objects of the plurality of consistency groups may be updated based upon, at least in part, the one or more fetched backend objects.

One or more of the following example features may be included. Determining the one or more dependencies may include determining one or more dependencies associated with a plurality of managed object types and a plurality of backend object types from one or more applications associated with the plurality of managed object types. Fetching the one or more backend objects of the plurality of consistency groups may include storing the one or more fetched backend objects of the plurality of consistency groups in a temporary database. Fetching the one or more backend objects may include fetching the one or more backend objects of a first consistency group of the plurality of consistency groups in parallel with the one or more backend objects of a second consistency group of the plurality of consistency groups. Updating the one or more managed objects of the plurality of consistency groups may include transforming the one or more fetched backend objects of the plurality of consistency group into one or more updated managed objects. The one or more managed objects of one or more consistency groups of the plurality of the consistency groups may be exposed to a user when the one or more managed objects of the one or more consistency groups are updated. The one or more dependencies may include one or more of dependencies between at least two managed objects of the plurality of managed objects and dependencies between at least two backend objects of the plurality of backend objects.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

Like reference symbols in the various drawings indicate like elements.

DETAILED DESCRIPTION

Figure 1:
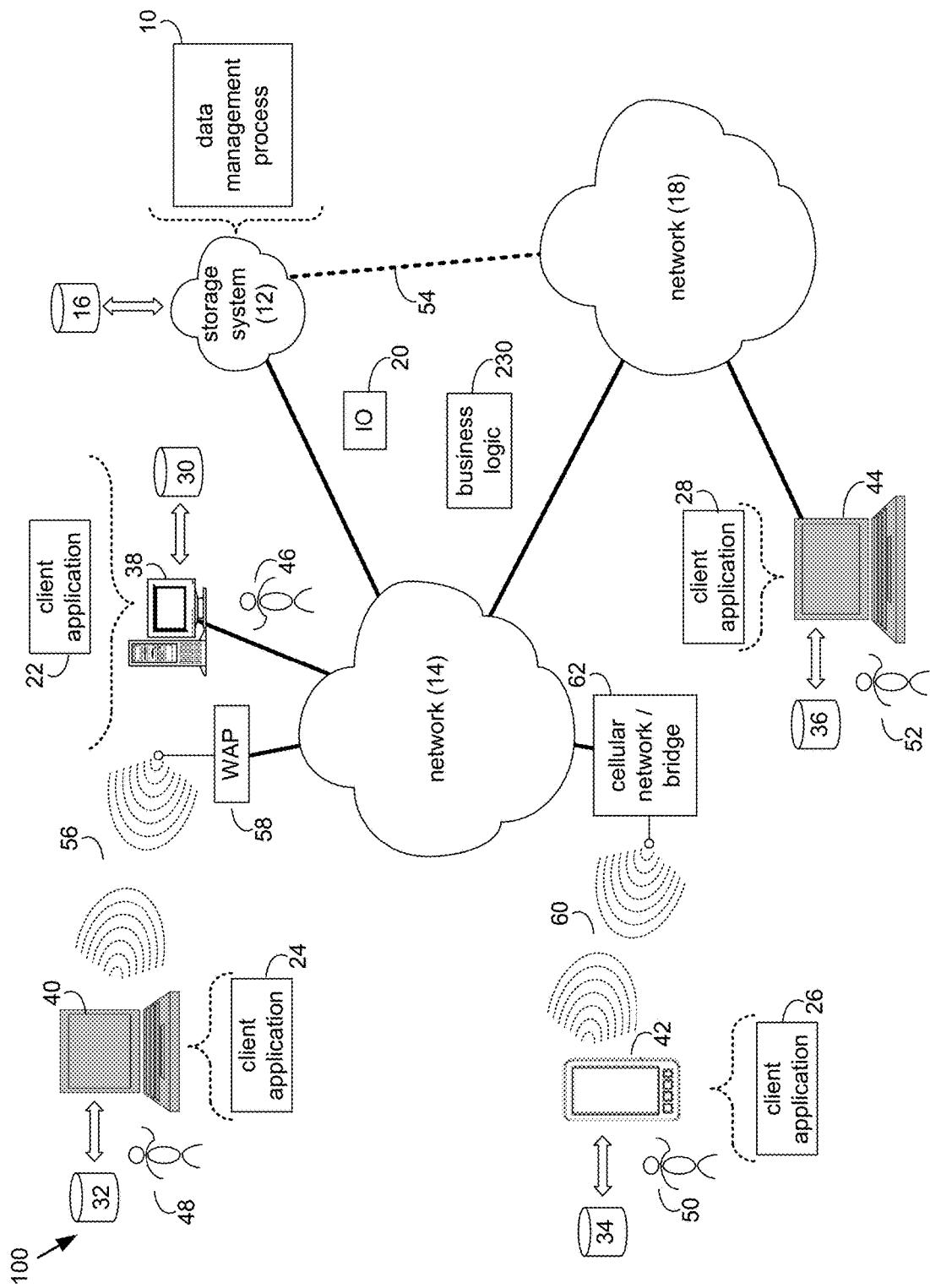
FIG. 1 is an example diagrammatic view of a storage system and a data management process coupled to a distributed computing network according to one or more example implementations of the disclosure.

System Overview:

Referring to the example implementation of FIG. 1, there is shown data management process 10 that may reside on and may be executed by storage system 12, which may be connected to network 14 (e.g., the Internet or a local area network). Examples of storage system 12 may include, but are not limited to: a Network Attached Storage (NAS) system, a Storage Area Network (SAN), a personal computer with a memory system, a server computer with a memory system, and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

The instruction sets and subroutines of data management process 10, which may be stored on storage device 16 included within storage system 12, may be executed by one or more processors and one or more memory architectures included within storage system 12. Storage device 16 may include but is not limited to: a hard disk drive; a tape drive; an optical drive; a RAID device; a random access memory (RAM); a read-only memory (ROM); and all forms of flash memory storage devices. Additionally/alternatively, some portions of the instruction sets and subroutines of data management process 10 may be stored on storage devices (and/or executed by processors and memory architectures) that are external to storage system 12.

Network 14 may be connected to one or more secondary networks (e.g., network 18), examples of which may include but are not limited to: a local area network; a wide area network; or an intranet, for example.

Various IO requests (e.g., IO request 20) may be sent from client applications 22, 24, 26, 28 to storage system 12. Examples of IO request 20 may include but are not limited to data write requests (i.e. a request that content be written to storage system 12) and data read requests (i.e. a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors and one or more memory architectures incorporated into client electronic devices 38, 40, 42, 44 (respectively). Storage devices 30, 32, 34, 36 may include but are not limited to: hard disk drives; tape drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, smartphone 42, notebook computer 44, a server, a data-enabled, cellular telephone, and a dedicated network device.

Users 46, 48, 50, 52 may access storage system 12 directly through network 14 or through secondary network 18. Further, storage system 12 may be connected to network 14 through secondary network 18, as illustrated with link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (e.g., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Smartphone 42 is shown wirelessly coupled to network 14 via wireless communication channel 60 established between smartphone 42 and cellular network/bridge 62, which is shown directly coupled to network 14.

Client electronic devices 38, 40, 42, 44 may each execute an operating system, examples of which may include but are not limited to: Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, as will be discussed below in greater detail, a data management process, such as data management process 10 of FIG. 1, may include but is not limited to, determining, at the computing device, one or more dependencies associated with a plurality of managed objects and a plurality of backend objects. A plurality of consistency groups with one or more managed objects of the plurality of managed objects and one or more backend objects of the plurality of backend objects may be generated based upon, at least in part, the one or more dependencies associated with the plurality of managed objects and the plurality of backend objects. The one or more backend objects of the plurality of consistency groups may be fetched. The one or more managed objects of the plurality of consistency groups may be updated based upon, at least in part, the one or more fetched backend objects.

For example purposes only, storage system 12 may be described as being a network-based storage system that includes a plurality of electro-mechanical backend storage devices. However, this is for example purposes only and is not intended to be a limitation of this disclosure, as other configurations are possible and are considered to be within the scope of this disclosure.

Figure 2:
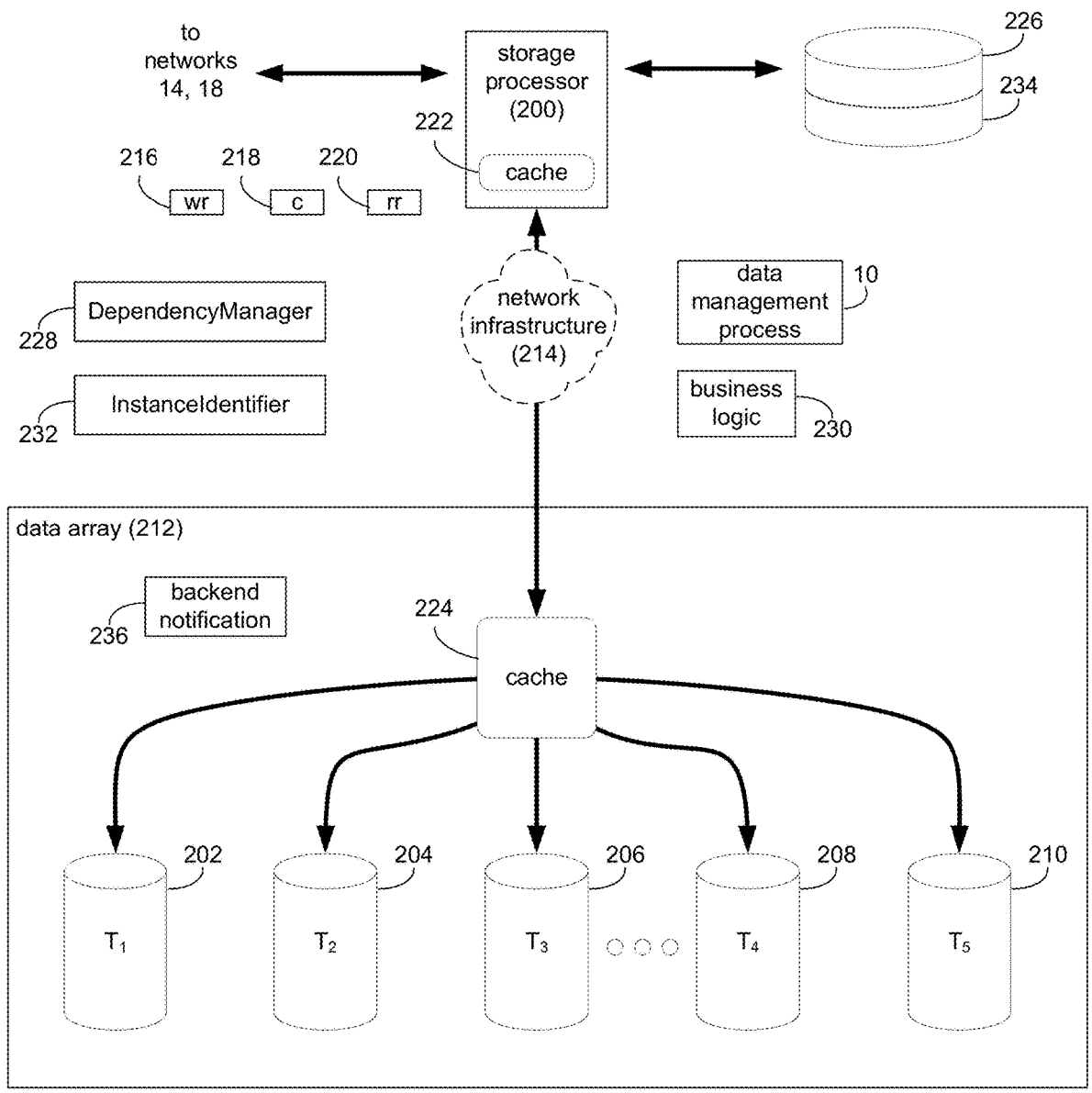
FIG. 2 is an example diagrammatic view of the storage system of FIG. 1 according to one or more example implementations of the disclosure.

Referring also to the example implementation of FIG. 2, storage system 12 may include storage processor 200 and a plurality of storage targets T 1-n (e.g., storage targets 202, 204, 206, 208). Storage targets 202, 204, 206, 208 may be configured to provide various levels of performance and/or high availability. For example, one or more of storage targets 202, 204, 206, 208 may be configured as a RAID 0 array, in which data is striped across storage targets. By striping data across a plurality of storage targets, improved performance may be realized. However, RAID 0 arrays do not provide a level of high availability. Accordingly, one or more of storage targets 202, 204, 206, 208 may be configured as a RAID 1 array, in which data is mirrored between storage targets. By mirroring data between storage targets, a level of high availability is achieved as multiple copies of the data are stored within storage system 12.

While storage targets 202, 204, 206, 208 are discussed above as being configured in a RAID 0 or RAID 1 array, this is for example purposes only and is not intended to be a limitation of this disclosure, as other configurations are possible. For example, storage targets 202, 204, 206, 208 may be configured as a RAID 3, RAID 4, RAID 5 or RAID 6 array.

While in this particular example, storage system 12 is shown to include four storage targets (e.g., storage targets 202, 204, 206, 208), this is for example purposes only and is not intended to be a limitation of this disclosure. Specifically, the actual number of storage targets may be increased or decreased depending upon e.g., the level of redundancy/performance/capacity required.

Storage system 12 may also include one or more coded targets 210. As is known in the art, a coded target may be used to store coded data that may allow for the regeneration of data lost/corrupted on one or more of storage targets 202, 204, 206, 208. An example of such a coded target may include but is not limited to a hard disk drive that is used to store parity data within a RAID array.

While in this particular example, storage system 12 is shown to include one coded target (e.g., coded target 210), this is for example purposes only and is not intended to be a limitation of this disclosure. Specifically, the actual number of coded targets may be increased or decreased depending upon e.g., the level of redundancy/performance/capacity required.

Examples of storage targets 202, 204, 206, 208 and coded target 210 may include one or more electro-mechanical hard disk drives and/or solid-state/flash devices, wherein a combination of storage targets 202, 204, 206, 208 and coded target 210 and processing/control systems (not shown) may form data array 212.

The manner in which storage system 12 is implemented may vary depending upon e.g., the level of redundancy/performance/capacity required. For example, storage system 12 may be a RAID device in which storage processor 200 is a RAID controller card and storage targets 202, 204, 206, 208 and/or coded target 210 are individual "hot-swappable" hard disk drives. Another example of such a RAID device may include but is not limited to an NAS device. Alternatively, storage system 12 may be configured as a SAN, in which storage processor 200 may be e.g., a server computer and each of storage targets 202, 204, 206, 208 and/or coded target 210 may be a RAID device and/or computer-based hard disk drives. Further still, one or more of storage targets 202, 204, 206, 208 and/or coded target 210 may be a SAN.

In the event that storage system 12 is configured as a SAN, the various components of storage system 12 (e.g., storage processor 200, storage targets 202, 204, 206, 208, and coded target 210) may be coupled using network infrastructure 214, examples of which may include but are not limited to an Ethernet (e.g., Layer 2 or Layer 3) network, a fiber channel network, an InfiniBand network, or any other circuit switched/packet switched network.

Storage system 12 may execute all or a portion of data management process 10. The instruction sets and subroutines of data management process 10, which may be stored on a storage device (e.g., storage device 16) coupled to storage processor 200, may be executed by one or more processors (not shown) and one or more memory architectures (not shown) included within storage processor 200. Storage device 16 may include but is not limited to: a hard disk drive; a tape drive; an optical drive; a RAID device; a random access memory (RAM); a read-only memory (ROM); and all forms of flash memory storage devices. As discussed above, some portions of the instruction sets and subroutines of data management process 10 may be stored on storage devices (and/or executed by processors and memory architectures) that are external to storage system 12.

As discussed above, various IO requests (e.g., IO request 20) may be generated. For example, these IO requests may be sent from client applications 22, 24, 26, 28 to storage system 12. Additionally/alternatively and when storage processor 200 is configured as an application server, these IO requests may be internally generated within storage processor 200. Examples of IO request 20 may include but are not limited to data write request 216 (i.e. a request that content 218 be written to storage system 12) and data read request 220 (i.e. a request that content 218 be read from storage system 12).

During operation of storage processor 200, content 218 to be written to storage system 12 may be processed by storage processor 200. Additionally/alternatively and when storage processor 200 is configured as an application server, content 218 to be written to storage system 12 may be internally generated by storage processor 200.

Storage processor 200 may include frontend cache memory system 222. Examples of frontend cache memory system 222 may include but are not limited to a volatile, solid-state, cache memory system (e.g., a dynamic RAM cache memory system) and/or a non-volatile, solid-state, cache memory system (e.g., a flash-based, cache memory system).

Storage processor 200 may initially store content 218 within frontend cache memory system 222. Depending upon the manner in which frontend cache memory system 222 is configured, storage processor 200 may immediately write content 218 to data array 212 (if frontend cache memory system 222 is configured as a write-through cache) or may subsequently write content 218 to data array 212 (if frontend cache memory system 222 is configured as a write-back cache).

Data array 212 may include backend cache memory system 224. Examples of backend cache memory system 224 may include but are not limited to a volatile, solid-state, cache memory system (e.g., a dynamic RAM cache memory system) and/or a non-volatile, solid-state, cache memory system (e.g., a flash-based, cache memory system). During operation of data array 212, content 218 to be written to data array 212 may be received from storage processor 200. Data array 212 may initially store content 218 within backend cache memory system 224 prior to being stored on e.g., one or more of storage targets 202, 204, 206, 208, and coded target 210.

As discussed above, the instruction sets and subroutines of data management process 10, which may be stored on storage device 16 included within storage system 12, may be executed by one or more processors (not shown) and one or more memory architectures (not shown) included within storage system 12. Accordingly, in addition to being executed on storage processor 200, some or all of the instruction sets and subroutines of data management process 10 may be executed by one or more processors (not shown) and one or more memory architectures (not shown) included within data array 212.

Further and as discussed above, during the operation of data array 212, content (e.g., content 218) to be written to data array 212 may be received from storage processor 200 and initially stored within backend cache memory system 224 prior to being stored on e.g., one or more of storage targets 202, 204, 206, 208, 210. Accordingly, during use of data array 212, backend cache memory system 224 may be populated (e.g., warmed) and, therefore, subsequent read requests may be satisfied by backend cache memory system 224 (e.g., if the content requested in the read request is present within backend cache memory system 224), thus avoiding the need to obtain the content from storage targets 202, 204, 206, 208, 210 (which would typically be slower).

Figure 3:
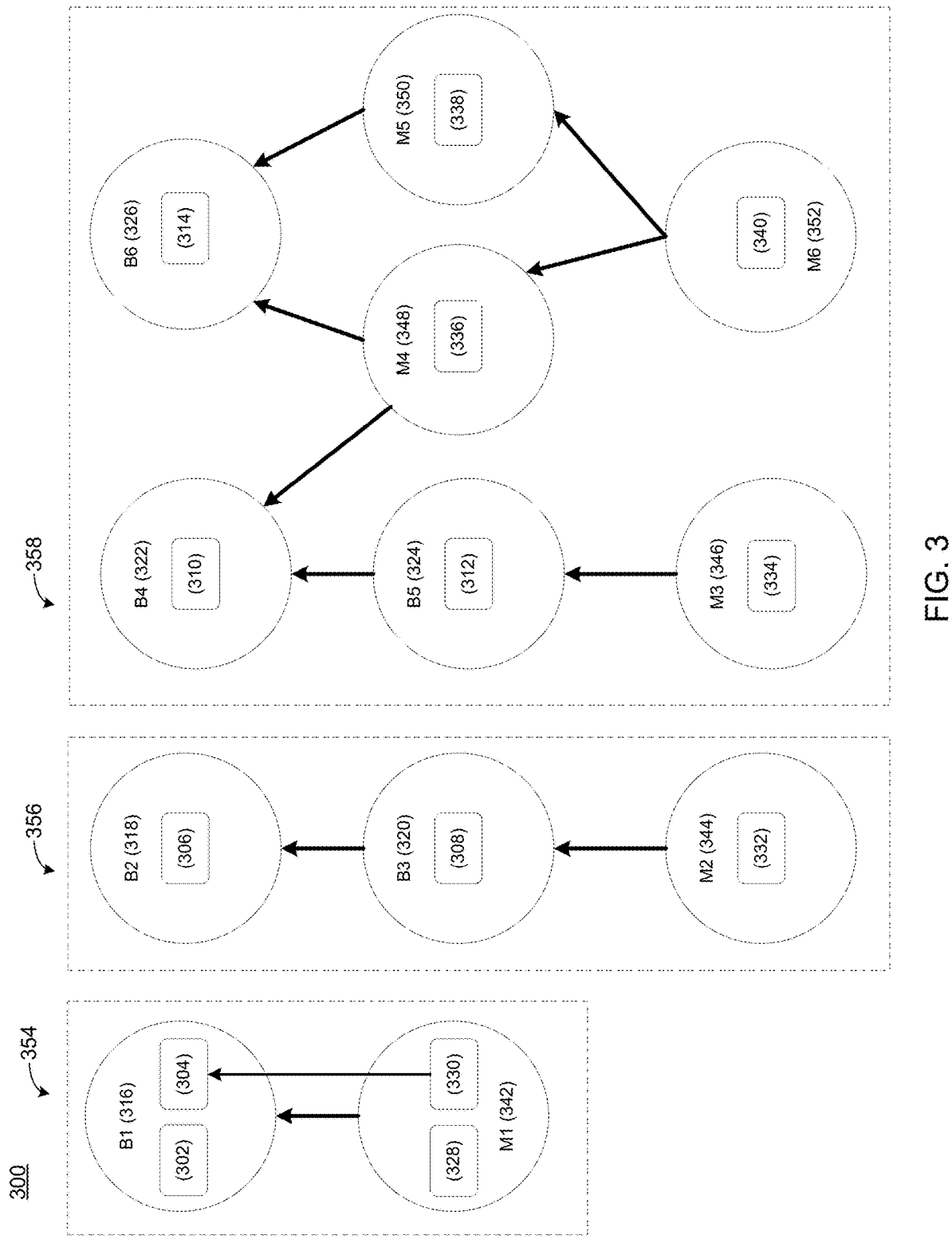
FIG. 3 is an example view of a dependency graph according to one or more example implementations of the disclosure.
Figure 4:
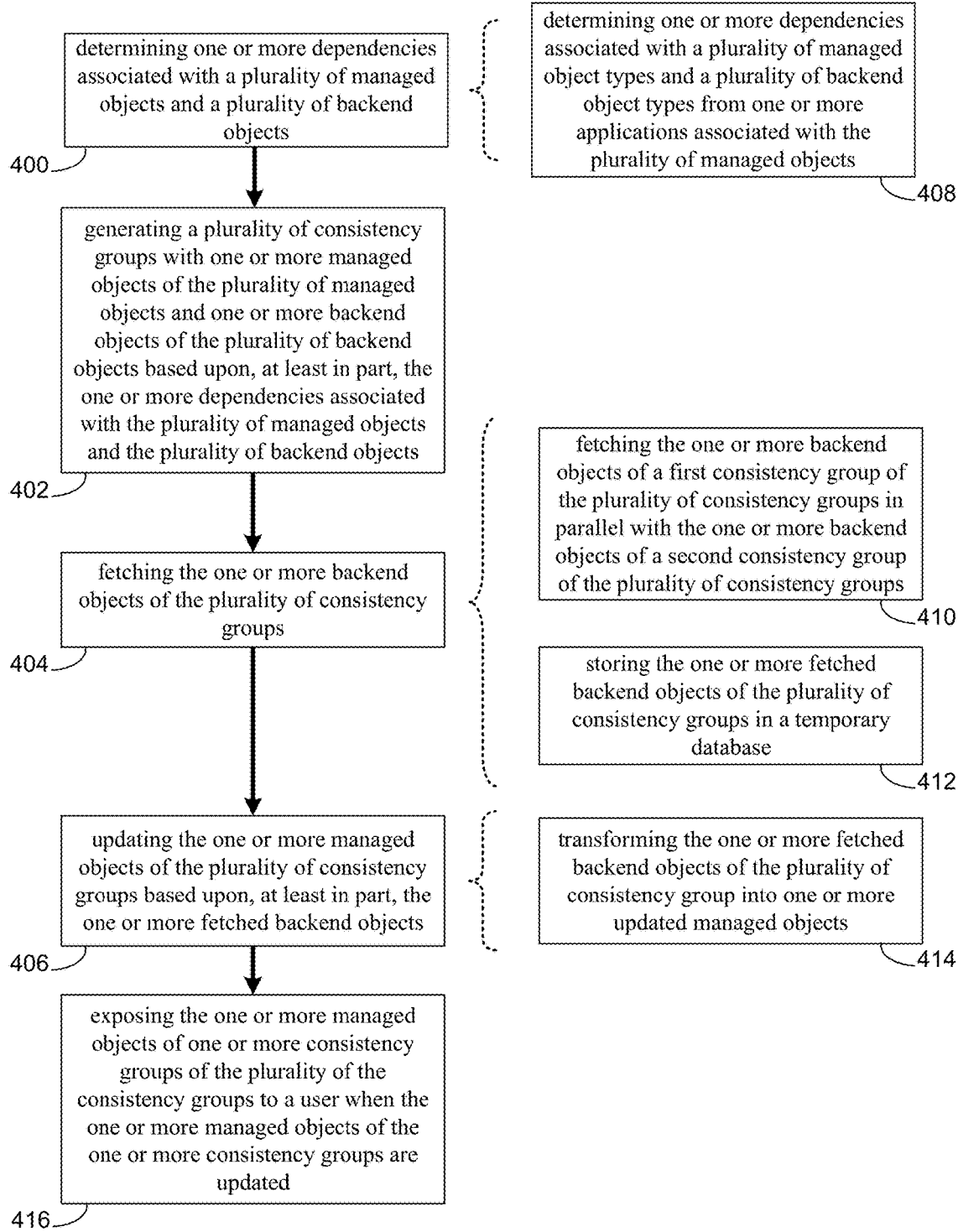
FIG. 4 is an example flowchart of a data management process of FIG. 1 according to one or more example implementations of the disclosure.

Backend Data and Managed Data:

As discussed above and referring also to the example implementation of FIGS. 3-4, storage system 12 may include backend data and managed data presented to a user and/or one or more applications (e.g., client applications 22, 24, 26, 28) for storage system administration. In some implementations and as will be described in greater detail below, backend data, managed data, and one or more dependencies associated with backend data and/or managed data may be, for example purposes only, represented in a dependency graph (e.g., dependency graph 300). As will be discussed in greater detail below, one or more dependencies may be represented by one or more arrows between various components of the dependency graph (e.g., dependency graph 300).

In some implementations, backend data may include a plurality of backend objects (e.g., backend objects 302, 304, 306, 308, 310, 312, 314) of and/or associated with a plurality of backend objet types (e.g., backend object types B1 316, B2 318, B3 320, B4 322, B5 324, B6 326). In some implementations, the plurality of backend object types may generally be classes or models that may describe behaviors, attributes, and/or states that a backend object of a given backend object type may support. In some implementations, backend object types may generally include but are not limited to volumes, RAID groups, snapshots, virtual volumes, mapped logical units (LUs), disks and other storage devices, Logical Unit Numbers (LUNs), and other logical objects or logical object types that may describe the organization of software and/or hardware components in storage system 12. A LUN may generally be a unit of logical storage. In some implementations, backend objects may participate in IO operations (e.g., IO request 20). In some implementations, backend objects or backend object instances may generally include one or more instances of the plurality of backend object types, (e.g., a disk backend object of the disk backend object type, a volume backend object instance of the volume backend object type, etc.). In some implementations, the organization of and attributes of the plurality of backend objects and/or backend object types may not be accessible or exposed to a user (e.g., via client applications 22, 24, 26, 28). In some implementations, the plurality of backend objects may be stored in data array 212.

In some implementations, managed data may include a plurality of managed objects (e.g., managed objects 328, 330, 332, 334, 336, 338, 340) of and/or associated with a plurality of managed object types (e.g., managed object types M1 342, M2 344, M3 346, M4 348, M5 350, M6 352). In some implementations, the plurality of managed object types may generally be classes that may describe behaviors and/or states that a managed object of a given managed object type may support. Managed object types may generally include but are not limited to Logical Unit Numbers (LUNs), replication sessions, disks or other storage devices, storage pools, file systems, volumes, snapshots, and other higher level data object types that may describe the organization of software and/or hardware components in storage system 12. Managed objects or managed object instances may generally include one or more instances of the plurality of managed object types, (e.g., one or more LUNs of the LUN type, one or more storage pools of the storage pool type, etc.). In some implementations, the plurality of managed objects and/or managed object types may mask the organization and/or composition of backend objects and/or backend object types from users and/or hosts by providing an organization of managed objects and/or managed object types that may be monitored by or configured by a user and/or one or more applications (e.g., client applications 22, 24, 26, 28). In some implementations, the plurality of managed objects may be stored in storage processor 200. In some implementations, the plurality of managed objects may be stored in a managed object database (e.g., managed object database 226).

In some implementations, managed data (e.g., managed objects 328, 330, 332, 334, 336, 338, 340) may depend on backend data (e.g., backend objects 302, 304, 306, 308, 310, 312, 314). For example, a plurality of managed object types (e.g., managed object types M1 342, M2 344, M3 346, M4 348, M5 350, M6 352) may depend on a plurality of backend object types (e.g., backend object types B1 316, B2 318, B3 320, B4 322, B5 324, B6 326). Additionally, a plurality of managed objects (e.g., managed objects 328, 330, 332, 334, 336, 338, 340) may depend upon a plurality of backend objects (e.g., backend objects 302, 304, 306, 308, 310, 312, 314). For example, one or more backend objects (e.g., backend object 304) may represent, for example purposes only, one or more RAID groups of a "RAID group" backend data object type (e.g., backend object type B1 316). In some implementations, one or more managed objects (e.g., managed object 330) which may, for example purposes only, represent one or more file systems of a "file system" managed object type (e.g., managed object type M1 342) may be created (e.g., by a client application 22, 24, 26, 28) and may depend upon the one or more RAID group backend objects (e.g., backend object 304). It will be appreciated that various managed objects may depend upon various backend objects within the scope of the present disclosure.

In some implementations, various applications (e.g., client applications 22, 24, 26, 28) may access and/or interact with a plurality of managed objects. As discussed above, a plurality of managed objects may be created from and/or otherwise may depend on one or more backend objects. As will be discussed in greater detail below, the dependencies associated with the plurality of managed objects and the plurality of backend objects may be specified by the various applications (e.g., client applications 22, 24, 26, 28) accessing or interacting with the plurality of managed objects.

As will be discussed in greater detail below, in some implementations, backend data may change independently of managed data. In some implementations the managed data that depends upon the backend data may need to be synced up with the latest backend data and made available to a user and/or storage administrator as a consistent set.

In some implementations and for example purposes only, assume that storage system 12 is configured as an application server. If and when storage system 12 or system processor 200 is offline, one or more changes may be made to the backend data. Once storage system 12 or storage processor 200 is online, the managed data that depends upon the backend data may need to be synced up with the latest backend data and made available to a user and/or storage administrator as a consistent set.

The Data Management Process:

As discussed above and referring also to the example implementations of FIGS. 3-4, data management process 10 may determine 400 one or more dependencies associated with a plurality of managed objects and a plurality of backend objects. Data management process 10 may generate 402 a plurality of consistency groups with one or more managed objects of the plurality of managed objects and one or more backend objects of the plurality of backend objects based upon, at least in part, the one or more dependencies associated with the plurality of managed objects and the plurality of backend objects. Data management process 10 may fetch 404 the one or more backend objects of the plurality of consistency groups. Data management process 10 may update 406 the one or more managed objects of the plurality of consistency groups based upon, at least in part, the one or more fetched backend objects.

In some implementations, data management process 10 may determine 400 one or more dependencies associated with a plurality of managed objects and a plurality of backend objects. Examples of dependencies associated with the plurality of managed objects and the plurality of backend objects may include but are not limited to dependencies between a plurality of managed objects and a plurality of backend objects, dependencies between a plurality of managed object types and backend object types, dependencies between at least two managed object types, dependencies between at least two backend object types, between at least two managed objects, and/or dependencies between at least two backend objects.

In some implementations, determining 400 the one or more dependencies associated with a plurality of managed objects and a plurality of backend objects may include determining 408 one or more dependencies associated with a plurality of managed object types and a plurality of backend object types from one or more applications associated with the plurality of managed object types. In some implementations, data management process 10 may receive the one or more dependencies associated with the plurality of managed object types and the plurality of backend object types from various applications (e.g., client applications 22, 24, 26, 28). For example, data management process 10 may determine 400 the one or more dependencies associated with a plurality of managed objects and a plurality of backend objects from one or more applications by executing a set of application programmable interfaces (APIs), programs, and/or processes configured to determine the one or more object or class dependencies from the plurality of applications. Data management process 10 may receive the one or more dependencies associated with a plurality of managed objects and a plurality of backend objects from the one or more applications (e.g., client applications 22, 24, 26, 28) in response to executing the set of application programmable interfaces (APIs). Accordingly, the one or more applications (e.g., via data management process 10) may specify the one or more dependencies between the plurality of managed object types and the plurality of backend object types.

In some implementations, data management process 10 may register the one or more dependencies associated with the plurality of managed object types and the plurality of backend object types. In some implementations, data management process 10 may register the one or more dependencies associated with a plurality of backend objects, a plurality of backend object types, a plurality of managed objects, and/or a plurality of managed object types of storage system 12 in a dependency graph (e.g., dependency graph 300). It will be appreciated that other data structures may be used to register the dependencies within the scope of the present disclosure. In some implementations, data management process 10 may register the one or more dependencies in a cache, database, storage device, software module, etc. (e.g., DependencyManager 228). Accordingly, in some implementations, DependencyManager 228 may manage (e.g., via data management process 10) the one or more dependencies. In some implementations, DependencyManager 228 may interact with and/or register the one or more dependencies in dependency graph 300.

For example and as discussed above, storage system 12 may include a plurality of backend objects (e.g., backend objects 302, 304, 306, 308, 310, 312, 314) of backend object types (e.g., backend object types B1 316, B2 318, B3 320, B4 322, B5 324, B6 326) and a plurality of managed objects (e.g., managed objects 328, 330, 332, 334, 336, 338, 340) of a plurality of managed object types (e.g., managed object types M1 342, M2 344, M3 346, M4 348, M5 350, M6 352). In some implementations, data management process 10 may determine that managed object type M1 342 depends upon backend object type B1 316 by receiving the one or more dependencies from one or more applications (e.g., client applications 22, 24, 26, 28) associated with managed object 330. Accordingly, data management process 10 may register the dependency between managed object type M1 342 and backend object type B1 316 in DependencyManager 228.

In some implementations, data management process 10 may determine 400 one or more dependencies between at least two managed object types of the plurality of managed object types. In some implementations and as discussed above, various applications (e.g., client applications 22, 24, 26, 28) may define dependencies between at least two managed object types. For example, data management process 10 may receive the one or more dependencies between at least two managed object types from various applications (e.g., client applications 22, 24, 26, 28) via, for example, a set of APIs. In some implementations, data management process 10 may determine 400 that managed object type M6 352 depends on managed object type M4 348 by receiving the one or more dependencies from one or more applications (e.g., client applications 22, 24, 26, 28) associated with managed object type M6 352 and managed object type M4 348. In some implementations, data management process 10 may register the dependency between managed object type 352 and managed object type 348 in DependencyManager 228.

In some implementations, data management process 10 may determine 400 one or more dependencies between at least two backend object types of the plurality of backend object types. For example, data management process 10 may determine 400 a dependency between backend object type B3 320 and backend object type B2 318. Additionally, in some implementations, data management process 10 may determine 400 dependencies between at least two backend objects of the plurality of backend objects. For example, data management process 10 may determine 400 a dependency between backend object 308 and backend object 306. In some implementations, data management process 10 may register the dependency between backend object type B3 320 and backend object type B2 318 in DependencyManager 228. Additionally, data management process 10 may register the dependency between backend object 308 and backend object 306 in DependencyManager 228.

In some implementations, determining 400 the one or more dependencies may be based upon, at least in part, business logic from one or more applications associated with the plurality of managed objects. In some implementations, business logic (e.g., business logic 230) from one or more applications (e.g., client applications 22, 24, 26, 28) associated with the plurality of managed objects may generally describe one or more effects that one or more changes to a plurality of backend objects may have on a plurality of managed objects. Additionally and/or alternatively, business logic (e.g., business logic 230) may generally describe the mapping of managed objects (e.g., managed objects 328, 330, 332, 334, 336, 338, 340) to backend objects (e.g., backend objects 302, 304, 306, 308, 310, 312, 314). In some implementations, the business logic (e.g., business logic 230) may be received from one or more applications (e.g., client applications 22, 24, 26, 28) by executing a set of APIs, programs, and/or processes configured to map the plurality of managed objects (e.g., managed objects 328, 330, 332, 334, 336, 338, 340) associated with the one or more applications (e.g., client applications 22, 24, 26, 28) to the plurality of backend objects (e.g., backend objects 302, 304, 306, 308, 310, 312, 314). In some implementations, business logic may generally define how a plurality of backend objects may be transformed into a plurality of managed objects for one or more applications (e.g., client applications 22, 24, 26, 28).

In some implementations, data management process 10 may determine 400 that managed object 330 of managed object type M1 342 depends upon backend object 304 of backend object type B1 316 based upon, at least in part, business logic (e.g., business logic 230) from one or more applications (e.g., client applications 22, 24, 26, 28) associated with managed object 330 and/or managed object type 342. Accordingly, data management process 10 may register the dependency between managed object 330 and backend object 304 in DependencyManager 228. Additionally and/or alternatively, data manager process 10 may register the between managed object 330 and backend object 130 in a separate module (e.g., InstanceIdentifier 232).

In some implementations, data management process 10 may register dependencies between at least two managed objects of the plurality of managed objects. For example, data management process 10 may determine 400 that managed object 340 of managed object type M6 352 depends upon managed object 336 of managed object type M4 348 based upon, at least in part, business logic (e.g., business logic 230) from one or more applications (e.g., client applications 22, 24, 26, 28) associated with managed objects 336, 340. Accordingly, data management process 10 may register the dependency between managed object 340 and managed object 336 in DependencyManager 228 and/or InstanceIdentifier 232.

In some implementations, data management process 10 may determine 400 the one or more dependencies associated with a plurality of managed objects and a plurality of backend objects as described above, during, for example, startup of storage system 12 and/or storage processor 200. As discussed above, in some implementations, storage system 12 may be configured as an application server. In some implementations when storage system 12 or storage processor 200 of storage system 12 is down, one or more backend objects may change. In some implementations, data management process 10 may determine 400 the one or more dependencies during startup or initialization of storage system 12 and/or storage processor 200.

In some implementations, data management process 10 may detect one or more cyclic dependencies associated with the plurality of managed objects and the plurality of backend objects and may flag the one or more cyclic dependencies as one or more errors.

In some implementations, data management process 10 may generate 402 a plurality of consistency groups with one or more managed objects of the plurality of managed objects and one or more backend objects of the plurality of backend objects based upon, at least in part, the one or more dependencies associated with the plurality of managed objects and the plurality of backend objects. In some implementations, a consistency group may generally refer to a set of connected or related objects. For example purposes only, a consistency group may include a set of connected objects in a dependency graph (e.g., dependency graph 300).

Referring again to the example implementation of FIG. 3, storage system 12 may include three consistency groups (e.g., consistency groups 354, 356, 358). In some implementations, consistency group 354 may include backend objects 302, 304 of backend object type B1 316, managed objects 328, 330 of managed object type M1 342. In some implementations, consistency group 356 may include backend object 306 of backend object type B2 318, backend object 308 of backend object type B3 320, and managed object 332 of managed object type M2 344. In some implementations, consistency group 358 may include backend object 310 of backend object type B4 322, backend object 312 of backend object type B5 324, backend object 314 of backend object type B6 326, managed object 334 of managed object type M3 346, managed object 336 of managed object type M4 348, managed object 338 of managed object type M5 350, and managed object 340 of managed object type M6 352 based upon the one or more dependencies associated with the plurality of managed objects and backend objects. It will be appreciated that other consistency groups are possible within the scope of the present disclosure.

In some implementations, data management process 10 may consult one or more of DependencyManager 228 and/or InstanceIdentifier 232 to determine which managed objects, managed object types, backend objects, and/or backend object types to include in the plurality of consistency groups.

In some implementations, data management process 10 may fetch 404 the one or more backend objects of the plurality of consistency groups. In some implementations, data management process 10 may fetch backend data specified in the plurality of consistency groups in parallel. Fetching 404 backend data may include fetching a plurality of backend object types. In some implementations, fetching 404 the plurality of backend object types (e.g., backend object types B1 316, B2 318, B3 320, B4 322, B5 324, B6 326) may include fetching 404 a plurality of backend objects (e.g., backend objects 302, 304, 306, 308, 310, 312, 314) of the plurality of backend object types. In some implementations, when a consistency group has multiple "leaf" backend object types (e.g., such as a backend object type that is not dependent on one or more backend or managed object types), data management process 10 may fetch 404 the plurality of backend object types within the consistency group in parallel until each of the one or more backend objects of the plurality of consistency groups are fetched. For example, data management process 10 may fetch 404 backend object 310 and/or backend object type B4 322 in parallel with backend object 314 and/or backend object type B6 326 of consistency group 358.

In some implementations, fetching 404 the one or more backend objects may include fetching 410 the one or more backend objects of a first consistency group of the plurality of consistency groups in parallel with the one or more backend objects of a second consistency group of the plurality of consistency groups. For example, data management process 10 may fetch 410 the plurality of backend objects and/or the plurality of backend object types of one or more of the plurality of consistency group in parallel. For example, data management process 10 may fetch 410 backend object type B1 316 and/or backend objects 302, 304 of consistency group 354 in parallel with backend object type B2 318 and/or backend object 306 of consistency group 356 and/or backend objects 310, 314 and/or backend object types B4 322, B6 326 of consistency group 358.

In some implementations, fetching 404 the one or more backend objects of the plurality of consistency groups may include storing 412 the one or more fetched backend objects of the plurality of consistency groups in a temporary database. For example, data management process 10 may fetch 404 the backend data, as described above, and store the backend data in a temporary database (e.g., temporary database 234). In some implementations, the temporary database may be a portion of the management object database (e.g., management object database 226).

In some implementations, data management process 10 may update 406 the one or more managed objects of the plurality of consistency groups based upon, at least in part, the one or more fetched backend objects. In some implementations, data management process 10 may compare the one or more fetched backend objects (e.g., backend objects 302, 304, 306, 308, 310, 312, 314) with the one or more managed objects (e.g., managed objects 328, 330, 332, 334, 336, 338, 340) in the managed object database (e.g., managed object database 226) based upon, at least in part, the one or more dependencies associated with the plurality of managed objects and the plurality of backend objects. As discussed above, the one or more backend objects of the plurality of consistency groups may be fetched and stored in a temporary database (e.g., temporary database 234). In some implementations, data management process 10 compare the one or more fetched backend objects (e.g., backend objects 302, 304, 306, 308, 310, 312, 314) in the temporary database (e.g., temporary database 234) with the one or more managed objects (e.g., managed objects 328, 330, 332, 334, 336, 338, 340) in the managed object database (e.g., managed object database 226) to determine how to update the one or more managed objects of the plurality of consistency groups from the one or more fetched backend objects and the business logic (e.g., business logic 230) received from the one or more applications (e.g., client applications 22, 24, 26, 28 via data management process 10) associated with the plurality of managed objects. For example, business logic (e.g., business logic 230) associated with managed object 330 may determine how to update managed object 330 based upon, at least in part, fetched backend object 304 from which managed object 330 may depend.

In some implementations, data management process 10 may determine which operations to perform on the plurality of managed objects. For example purposes only, operations on the plurality of managed objects may generally include creating, modifying, and deleting the plurality of managed objects (e.g., managed objects 328, 330, 332, 334, 336, 338, 340) based upon the fetched backend objects (e.g., backend objects 302, 304, 306, 308, 310, 312, 314) and the business logic (e.g., business logic 230) associated with the plurality of managed objects (e.g., managed objects 328, 330, 332, 334, 336, 338, 340).

In some implementations, data management process 10 may update 406 the one or more managed objects of the plurality of consistency groups as the one or more fetched backend objects of the plurality of consistency groups are stored in the temporary database (e.g., temporary database 234).

In some implementations, updating 406 the one or more managed objects of the plurality of consistency groups may include transforming 414 the one or more fetched backend objects of the plurality of consistency group into one or more updated managed objects. As discussed above, in some implementations, data management process 10 may determine how to update 406 the plurality of managed objects of the plurality of consistency groups based upon the business logic (e.g., business logic 230) received from the one or more applications (e.g., client applications 22, 24, 26, 28) associated with the plurality of managed objects (e.g., managed objects 328, 330, 332, 334, 336, 338, 340) and the one or more fetched backend objects (e.g., backend objects 302, 304, 306, 308, 310, 312, 314). In some implementations, data management process 10 may transform 414 the one or more fetched backend objects into one or more updated managed objects based upon the business logic (e.g., business logic 230) from the one or more applications (e.g., client applications 22, 24, 26, 28) associated with the plurality of managed objects (e.g., managed objects 328, 330, 332, 334, 336, 338, 340). For example, data management process 10 may transform 414 fetched backend object 304 into updated managed object 330 based upon, at least in part, the business logic (e.g., business logic 230) received from the one or more applications (e.g., client applications 22, 24, 26, 28) associated with managed object 330.

In some implementations, data management process 10 may expose 416 the one or more managed objects of one or more consistency groups of the plurality of the consistency groups when the one or more managed objects of the one or more consistency groups are updated. In some implementations, exposing 416 the one or more managed objects may generally include making the one or more managed objects visible or accessible to a user and/or one or more applications (e.g., client applications 22, 24, 26, 28). In some implementations, exposing 416 the one or more managed objects may generally include transferring the one or more managed objects (e.g., managed objects 328, 330, 332, 334, 336, 338, 340) to managed object database (e.g., managed object database 226) where the one or more managed objects may be visible or accessible to a user and/or one or more applications (e.g., client applications 22, 24, 26, 28 via data management process 10).

In some implementations, the transformation 414 and updating 406 of the plurality of managed objects of one or more consistency groups may be protected by one or more transactions. For example, data management process 10 may create a single transaction for each consistency group (e.g., consistency groups 354, 356, 358) such that the plurality of managed objects of a consistency group are updated 406 and exposed 416 to a user and/or one or more applications (e.g., client applications 22, 24, 26, 28) in a single transaction. In some implementations, this may ensure that a user always sees a consistent set of data. For example, data management process 10 may ensure that a user and/or one or more applications (e.g., client applications 22, 24, 26, 28) may not see or access managed object 336 of managed object type M4 348 and managed object 340 of managed object type M6 352 from the managed object database (e.g., managed object database 226) with inconsistent values. Additionally, data management process 10 may update 406 each of the plurality of managed objects (e.g., managed objects 328, 330, 332, 334, 336, 338, 340) of each consistency group (e.g., consistency groups 354, 356, 358) in a single transaction. Accordingly, a user and/or one or more applications (e.g., client applications 22, 24, 26, 28 via data management process 10) may access or see the plurality of managed objects in managed object database 226 on a consistency group level.

In some implementations, data management process 10 may prevent a user from accessing or seeing inconsistent data even when they see partial data (e.g., a plurality of managed objects of one or more consistency groups of the plurality of consistency groups are exposed). For example, data management process 10 may finish updating 406 managed objects 328, 330 of managed object type M1 342 of consistency group 354 before managed object 332 of managed object type M2 344 of consistency group 356 is finished updating. In some implementations, data management process 10 may expose 416 managed objects 328, 330 of managed object type M1 342 of consistency group 354 before exposing 416 managed object 332 of managed object type M2 344 of consistency group 356. Accordingly, data management process 10 may update 406 and expose 416 the plurality of consistency groups in parallel such that one or more consistency groups are updated and exposed before other consistency groups.

In some implementations, data management process 10 may update 406 the one or more managed objects during startup of storage system 12 and/or storage processor 100. In some implementations, data management process 10 may update 406 the one or more managed objects when data management process 10 determines that one or more backend notifications (e.g., backend notification 312) have not been received and/or processed. In some implementations, the one or more backend notifications (e.g., backend notification 236) may generally describe a change to at least one backend object. In some implementations, data management process 10 may be configured (e.g., by a user) to update the plurality of managed objects periodically (e.g., such as every day, every week, etc.).

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to implementations of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various implementations of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents (e.g., of all means or step plus function elements) that may be in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications, variations, substitutions, and any combinations thereof will be apparent to those of ordinary skill in the art without departing from the scope and spirit of the disclosure. The implementation(s) were chosen and described in order to explain the principles of the disclosure and the practical application, and to enable others of ordinary skill in the art to understand the disclosure for various implementation(s) with various modifications and/or any combinations of implementation(s) as are suited to the particular use contemplated.

Having thus described the disclosure of the present application in detail and by reference to implementation(s) thereof, it will be apparent that modifications, variations, and any combinations of implementation(s) (including any modifications, variations, substitutions, and combinations thereof) are possible without departing from the scope of the disclosure defined in the appended claims.

What is claimed is:

1. A computer-implemented method, executed on a computing device, comprising:
   determining, at the computing device, one or more dependencies associated with a plurality of managed objects and a plurality of backend objects, wherein the one or more dependencies associated with the plurality of managed objects and the plurality of backend objects are determined from one or more applications, the one or more applications are configured to execute one or more of a set of application programmable interfaces, programs, and processes, the one or more of the set of application programmable interfaces, programs, and processes are configured to determine the one or more dependencies associated with the plurality of managed objects and the plurality of backend objects;
   generating a plurality of consistency groups with one or more managed objects of the plurality of managed objects and one or more backend objects of the plurality of backend objects based upon, at least in part, the one or more dependencies associated with the plurality of managed objects and the plurality of backend objects;
   fetching the one or more backend objects of the plurality of consistency groups; and
   updating the one or more managed objects of the plurality of consistency groups based upon, at least in part, the one or more fetched backend objects.

2. The computer-implemented method of claim 1, wherein determining the one or more dependencies includes determining one or more dependencies associated with a plurality of managed object types and a plurality of backend object types from one or more applications associated with the plurality of managed object types.

3. The computer-implemented method of claim 1, wherein fetching the one or more backend objects of the plurality of consistency groups includes storing the one or more fetched backend objects of the plurality of consistency groups in a temporary database.

4. The computer-implemented method of claim 1, wherein fetching the one or more backend objects includes fetching the one or more backend objects of a first consistency group of the plurality of consistency groups in parallel with the one or more backend objects of a second consistency group of the plurality of consistency groups.

5. The computer-implemented method of claim 1, wherein updating the one or more managed objects of the plurality of consistency groups includes transforming the one or more fetched backend objects of the plurality of consistency group into one or more updated managed objects.

6. The computer-implemented method of claim 1, further comprising:
exposing the one or more managed objects of one or more consistency groups of the plurality of the consistency groups to a user when the one or more managed objects of the one or more consistency groups are updated.

7. The computer-implemented method of claim 1, wherein the one or more dependencies include one or more of:
dependencies between at least two managed object types of the plurality of managed object types, and
dependencies between at least two backend object types of the plurality of backend object types.

8. A computer program product residing on a non-transitory computer readable medium having a plurality of instructions stored thereon which, when executed across one or more processors, causes at least a portion of the one or more processors to perform operations comprising:
determining one or more dependencies associated with a plurality of managed objects and a plurality of backend objects, wherein the one or more dependencies associated with the plurality of managed objects and the plurality of backend objects are determined from one or more applications, the one or more applications are configured to execute one or more of a set of application programmable interfaces, programs, and processes, the one or more of the set of application programmable interfaces, programs, and processes are configured to determine the one or more dependencies associated with the plurality of managed objects and the plurality of backend objects;
generating a plurality of consistency groups with one or more managed objects of the plurality of managed objects and one or more backend objects of the plurality of backend objects based upon, at least in part, the one or more dependencies associated with the plurality of managed objects and the plurality of backend objects;
fetching the one or more backend objects of the plurality of consistency groups; and updating the one or more managed objects of the plurality of consistency groups based upon, at least in part, the one or more fetched backend objects.

9. The computer program product of claim 8, wherein determining the one or more dependencies includes determining one or more dependencies associated with a plurality of managed object types and a plurality of backend object types from one or more applications associated with the plurality of managed object types.

10. The computer program product of claim 8, wherein fetching the one or more backend objects of the plurality of consistency groups includes storing the one or more fetched backend objects of the plurality of consistency groups in a temporary database.

11. The computer program product of claim 8, wherein fetching the one or more backend objects includes fetching the one or more backend objects of a first consistency group of the plurality of consistency groups in parallel with the one or more backend objects of a second consistency group of the plurality of consistency groups.

12. The computer program product of claim 8, wherein updating the one or more managed objects of the plurality of consistency groups includes transforming the one or more fetched backend objects of the plurality of consistency group into one or more updated managed objects.

13. The computer program product of claim 8, wherein the operations further comprise:
exposing the one or more managed objects of one or more consistency groups of the plurality of the consistency groups to a user when the one or more managed objects of the one or more consistency groups are updated.

14. The computer program product of claim 8, wherein the one or more dependencies include one or more of:
dependencies between at least two managed object types of the plurality of managed object types, and
dependencies between at least two backend object types of the plurality of backend object types.

15. A computing system including one or more processors and one or more memories configured to perform operations comprising:
determining one or more dependencies associated with a plurality of managed objects and a plurality of backend objects, wherein the one or more dependencies associated with the plurality of managed objects and the plurality of backend objects are determined from one or more applications, the one or more applications are configured to execute one or more of a set of application programmable interfaces, programs, and processes, the one or more of the set of application programmable interfaces, programs, and processes are configured to determine the one or more dependencies associated with the plurality of managed objects and the plurality of backend objects;
generating a plurality of consistency groups with one or more managed objects of the plurality of managed objects and one or more backend objects of the plurality of backend objects based upon, at least in part, the one or more dependencies associated with the plurality of managed objects and the plurality of backend objects;
fetching the one or more backend objects of the plurality of consistency groups; and
updating the one or more managed objects of the plurality of consistency groups based upon, at least in part, the one or more fetched backend objects.

16. The computing system of claim 15, wherein determining the one or more dependencies includes determining one or more dependencies associated with a plurality of managed object types and a plurality of backend object types from one or more applications associated with the plurality of managed object types.

17. The computing system of claim 15, wherein fetching the one or more backend objects of the plurality of consistency groups includes storing the one or more fetched backend objects of the plurality of consistency groups in a temporary database.

18. The computing system of claim 15, wherein fetching the one or more backend objects includes fetching the one or more backend objects of a first consistency group of the plurality of consistency groups in parallel with the one or more backend objects of a second consistency group of the plurality of consistency groups.

19. The computing system of claim 15, wherein updating the one or more managed objects of the plurality of consistency groups includes transforming the one or more fetched backend objects of the plurality of consistency group into one or more updated managed objects.

20. The computing system of claim 15, wherein the operations further comprise:
   exposing the one or more managed objects of one or more consistency groups of the plurality of the consistency groups to a user when the one or more managed objects of the one or more consistency groups are updated.

* * * * *